United States Patent [19]
Jenkins et al.

[11] Patent Number: 5,644,386
[45] Date of Patent: Jul. 1, 1997

[54] VISUAL RECOGNITION SYSTEM FOR LADAR SENSORS

[75] Inventors: Gary Kim Jenkins, Arlington; Bruno Jack Evans, Euless; David Collis Williams, Jr., Burleson; Arthur Steven Bornowski, Garland, all of Tex.

[73] Assignee: Loral Vought Systems Corp., Grand Prairie, Tex.

[21] Appl. No.: 371,284

[22] Filed: Jan. 11, 1995

[51] Int. Cl.$^6$ .............................. G01C 3/08; H04N 7/18; H04N 7/12; G01N 5/02
[52] U.S. Cl. .............. 356/4.01; 250/342; 244/3.16; 348/143; 348/147; 348/384; 348/418; 382/224; 382/103
[58] Field of Search .................. 356/5.04, 4.01; 244/3.16; 382/224, 103; 348/143, 147, 384, 418; 250/342

[56] References Cited

U.S. PATENT DOCUMENTS

| | | |
|---|---|---|
| 4,716,414 | 12/1987 | Luttrell et al. . |
| 4,760,537 | 7/1988 | Martin et al. . |
| 4,862,257 | 8/1989 | Ulich . |
| 5,013,917 | 5/1991 | Ulich . |
| 5,034,810 | 7/1991 | Keeler . |
| 5,114,226 | 5/1992 | Goodwin et al. . |
| 5,140,416 | 8/1992 | Tinkler . |
| 5,142,659 | 8/1992 | Rao et al. ................. 382/9 |
| 5,200,606 | 4/1993 | Krasutsky et al. ........ 250/234 |
| 5,233,415 | 8/1993 | French et al. . |
| 5,243,541 | 9/1993 | Ulich . |
| 5,275,354 | 1/1994 | Minor et al. .............. 244/3.17 |
| 5,430,806 | 7/1995 | Nettles ..................... 382/295 |
| 5,495,576 | 2/1996 | Ritchey ..................... 395/125 |

*Primary Examiner*—Stephen C. Buczinski
*Attorney, Agent, or Firm*—Arnold, White & Durkee

[57] ABSTRACT

A visual recognition system is disclosed for detecting a target within a scene. A LADAR system and method is employed for scanning laser light signals across a scene having a target to be characterized. Laser light reflected from the target is detected and processed into a three-dimensional image. The three-dimensional image is segmented to separate the target from the overall scene. Substantially, only the segmented target data is either displayed locally or transmitted via a narrow bandwidth transmission medium to a remote site for display. The invention finds particular application in military situations where enemy armor is detected and the segmented version of the armor is transmitted via SINCGARS.

20 Claims, 4 Drawing Sheets

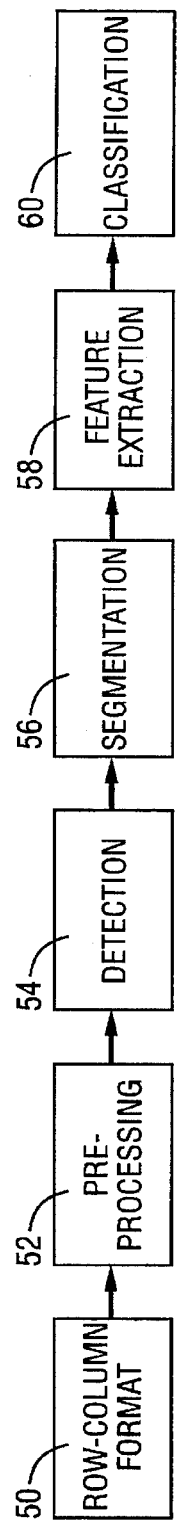
FIG. 3
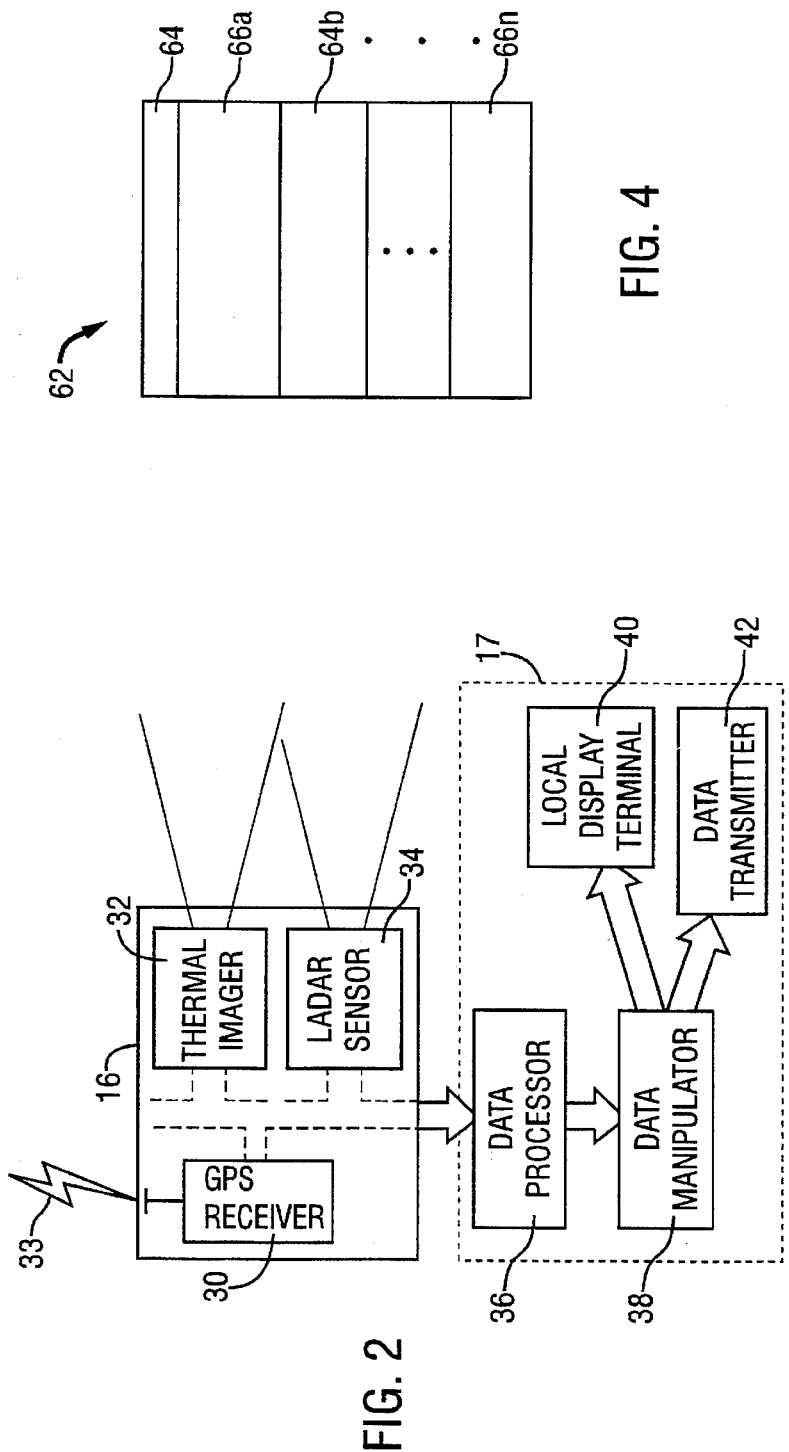
FIG. 4
FIG. 2

VISUAL RECOGNITION SYSTEM FOR LADAR SENSORS

BACKGROUND OF INVENTION

1. Field of Invention

The present invention relates in general to an improved system and method for developing, displaying, and transmitting three-dimensional images of a target scene over a limited bandwidth transmission medium. More specifically, the invention concerns a LADAR system and method for producing and processing light signals to be representative of a three-dimensional target scene, and transmitting the processed signals over limited bandwidth data links for displaying a segment of the scene at a remote site.

2. Description of Related Art

A need of great importance in military and some civilian operations is the ability to quickly detect and identify objects, frequently referred to as "targets" in a background or scene. A common problem in military operations, for example, is to detect and identify targets in the form of armor, such as tanks, vehicles, guns, and similar items which have been camouflaged or which are operating at night or in foggy weather. It is important in many instances to be able to distinguish reliably between enemy armor and friendly armor. It is important that such information be available not only on-site but also at various command levels, generally at remote locations. It is also critical that the information be accurate and promptly transmitted. All too frequently, critical decisions must be made on-site without adequate knowledge or review by command personnel.

Presently, transmission of target acquisition data from a field to a remote command station is believed to be limited to voice, text, or icon representations of information that a human operator has previously distilled. That is, before sensor-gathered target acquisition data is transmitted, an on-site human operator must process the sensor-gathered target acquisition data and manually enter the processed data into a system. For example, in current implementations, voice is used to transmit sensor-gathered target acquisition data over a Single Channel Ground and Air Radio System (SINCGARS). To effect such a transmission, a human operator at a sensor site processes sensor-gathered target acquisition data by visually identifying targets. This on-site human operator typically then transmits the processed sensor-gathered target acquisition data by voice. At the receiving end, a remote human operator interprets the transmitted data and represents that data on a paper map or plastic overlay. Additionally, the remote operator utilizes the transmitted data to classify the detected target as friend or foe. Consequently, when a target is detected, a receiving combat platform and/or command and control node must make strategic decisions based on target acquisition data that has been processed by an on-site human operator, transmitted using voice format, interpreted by a receiving remote human operator, and displayed on paper maps and plastic overlays.

Additionally, current systems for on-site sensing use sensors which produce raw data in a format that cannot be efficiently transmitted to other platforms at the limited bandwidth of existing and planned SINCGARS communications equipment. In that regard, high quality imaging sensors produce very large amounts of digital data. For example, a typical video transmission consisting of 512×512 pixels (each pixel comprising 8 bits of grey scale or color) at a 30 Hz frame rate yields approximately 7.9 megabytes of data per second (512×512×30). But SINCGARS typically are characterized as having a bandwidth of only 16 kilobit/sec. (projected) and 4.8 kilobit/sec. (existing). Attempting to transmit video over the 16 kilobit/sec. projected and the 4.8 kilobit/sec. existing military SINCGARS network poses bandwidth and/or speed problems for many applications.

Another known approach to overcome SINCGARS limited bandwidth restriction is to perform target classification at the sensor site (i.e., on-site) and transmit only the results of the target classification. In this instance, target classification is performed by an on-site computer employing an automatic target recognition algorithm wherein sensor-gathered target acquisition data is characterized using computer models. For example, a LADAR ("LAser Detection And Ranging") system may be employed to scan the scene with a laser beam. A sensor detects reflected beams characteristic of the scanned target and generates target acquisition data. Once the sensor-gathered target acquisition data is received, the computer algorithms classify the target. The result of this target classification is then transmitted over communication links to a combat platform or command and control node (i.e., a remote site), where decision-makers determine whether to engage the detected target. By reducing the amount of data requiring transmission, this approach functions with limited bandwidth capability. However, this approach suffers from the problem that battlefield decision-makers are usually reluctant to attack targets classified solely by a computer.

In summary, within the limited bandwidth environment, users currently are faced with two less than desired options: (1) attempt to transmit complete video images resulting in saturated data links or reduced-quality imagery, or (2) allow a remote sensor and computer to perform target classification and transmit text results of the classification, forcing a user to take actions based solely on the results of remote equipment.

SUMMARY OF THE INVENTION

The above-noted and other disadvantages of the prior art are overcome by the present invention. An improved system and method for generating, processing, displaying, and transmitting images of a target scene over a limited bandwidth transmission medium employs a LADAR imaging system. The LADAR system scans a target scene to provide on-site a three-dimensional (3D) image (representation) of the target scene. This image is processed to detect and segment potential targets. The segmentations representing these potential targets are then further processed by feature extracting and classification processes to identify the target. The segmentations of targets of interest previously completed prior to feature extraction and classification are either or both displayed locally or transmitted to a remote site for display. Because only the segmented targets rather than the entire scene is transmitted, this process allows communications over data links of limited bandwidth. The invention also allows display of the 3-D target in a plurality of user-selectable formats.

In accordance with the present invention, a sensing system includes a LADAR sensor for scanning the target and target scene with laser light and for collecting three-dimensional images of the target and target scene. A programmable data processor processes the sensor-generated three-dimensional images in real time to provide accurate target position data for calculating target location. A transmitter and display is then provided for those processed sensor-generated three-dimensional images. The target may be displayed either locally or after transmission in any one of a variety of user-selectable formats.

By transmitting substantially only an image of the target, the present invention provides a remote sensing system capable of transmitting high fidelity imagery via limited bandwidth communications links for display in a variety of configurations. The present invention is particularly applicable for applications where a limited radio communications system, such as SINCGARS, must be used to transmit high-quality information between a remote sensor and another platform. In such applications, because the bandwidth available for data transmission is limited, the invention transmits images having a reduced number of pixels.

DESCRIPTION OF THE DRAWINGS

The nature, features, and advantages of the invention will become more apparent to those skilled in the art after considering a more detailed embodiment of the invention in conjunction with the following drawings, in which like reference numerals designate like parts throughout, wherein:

FIG. 2 illustrates the components of the sensor platform and the processing center of FIG. 1 in accordance with the present invention;

FIG. 3 illustrates an embodiment of the image processing steps according to the invention;

FIG. 4 illustrates an information packet which may be used according to the invention;

FIG. 5c illustrates a display option for Rotated Perspective View of the transmitted segment.

DESCRIPTION OF A PREFERRED EMBODIMENT

The present invention relates to an improved system for producing, processing, transmitting, and displaying energy signals, such as laser light pulses, which are reflected from one or more targets in a target scene. A processor responds to the reflected signals and displays a three-dimensional (3-D) image of the segment of the target scene containing the target. Data packets of three-dimensional image data of only the target are generated and either displayed locally or transmitted over limited bandwidth data links for display at a remote site.

Figure 1:
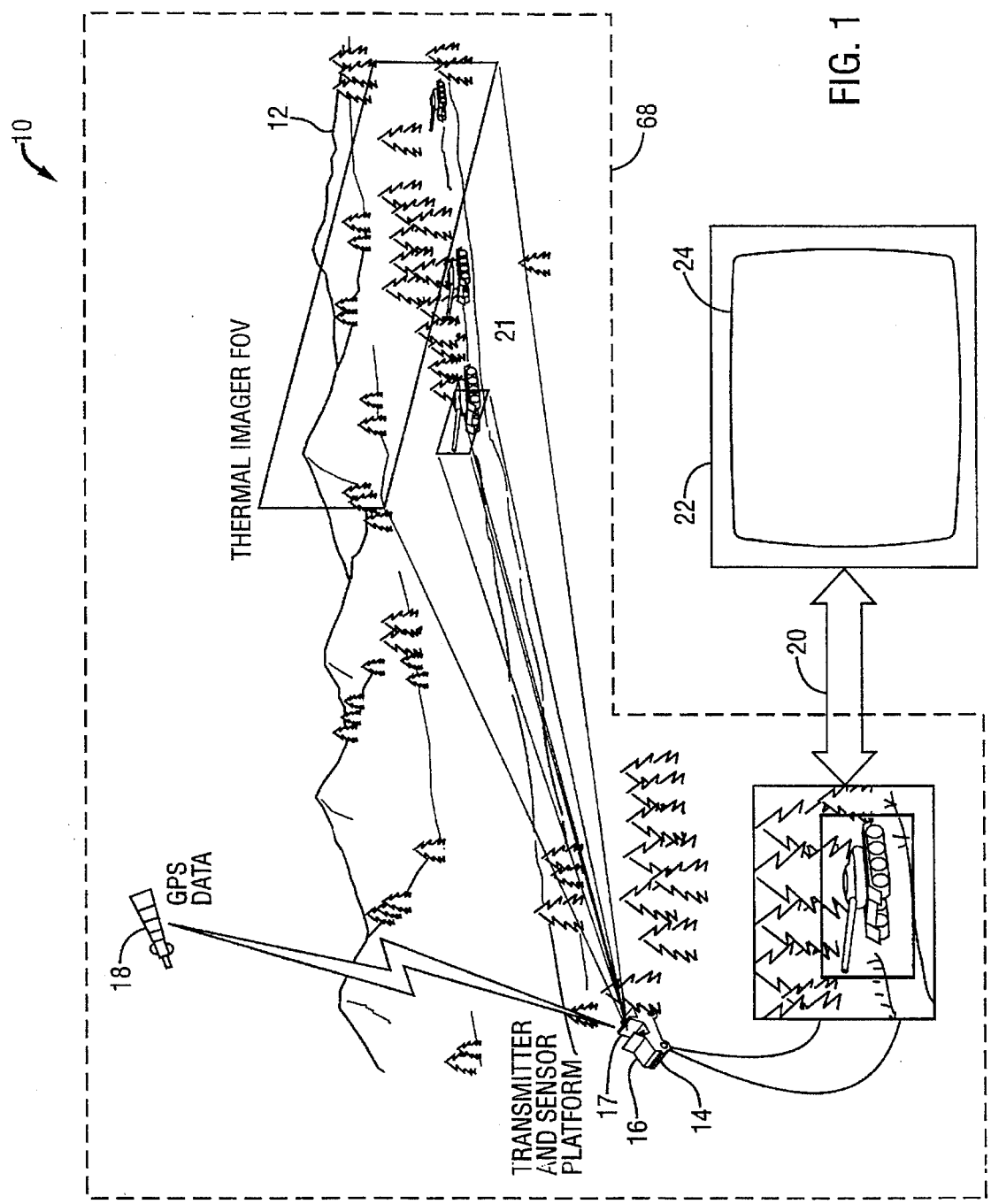
FIG. 1 illustrates one embodiment of the present invention as applied to military applications.

Referring now to FIG. 1 and a preferred embodiment of the invention, an improved system 10 is shown for producing, processing, displaying, and transmitting images of one or more targets in a target scene 12. A mobile target detection, location, and classification system includes a vehicle 14 for housing a transmitter and sensor platform 16 and a processing center 17. The platform 16 includes a conventional LADAR ("LAser Dectection and Ranging") system which generates and directs a laser beam to scan the target scene 12, including the targets. Reflected laser light is detected by the platform 16, and the processing center 17 processes the reflected light in a conventional manner into a scan data representative of the target scene 12. A Global Positioning System (GPS) transmitter 18 transmits a signal for providing accurate position data for the vehicle 14. In use, the mobile target, detection, and classification system 10 processes 3-D LADAR images of the target scene 12 in the processing center 17, manipulates the resulting data into packets of information containing on a segment of the scene and transmits these packets of information by a limited bandwidth communications link 20 to a remote site 22 for display on a display 24.

FIG. 2 depicts a preferred embodiment of the sensor platform 16 and processing platform 17 housed on the vehicle 14 of FIG. 1. The sensor platform 16 supports a GPS receiver 30 disposed to receive a signal 33 from the GPS transmitter 18 of FIG. 1. A thermal imager 32 provides passive field of view search capability of the target scene 12 of FIG. 1. A LADAR sensor 34 generates a scan signal representative of an image of the target scene 12 of FIG. 1 by scanning a laser beam across the scene 12 and detecting reflections of the laser beam as it scans the scene 12. Although a number of different known LADAR arrangements may be employed, a preferred system is that disclosed in U.S. Pat. No. 5,200,606, entitled "LASER RADAR SCANNING SYSTEM", filed Jul. 2, 1991, in the name of Krasutsky et al. The '606 patent is hereby incorporated by reference. A preferred sensor 34 and associated pulse processing circuitry is disclosed in U.S. Pat. No. 5,243,553 entitled "GATE ARRAY PULSE CAPTURE DEVICE" filed Jul. 2, 1991 in the name of Flockencier. The '553 patent is incorporated herein by reference.

The processing center 17 includes a data processor 36 for processing the scan signal into 3-D LADAR images. A data manipulator 38 is provided for manipulating selected 3-D LADAR image data into packets of information which may be displayed by a local display terminal 40 at local site 68 (shown in FIG. 1) for on-site display of the target 21 of FIG. 1. A low-bandwidth data transmitter 42 is also provided for transmitting the packets of segmented information over the limited bandwidth communications link 20 of FIG. 1.

In accordance with the preferred embodiment of the present invention, the GPS receiver 30 is a commercially available, six-channel GPS receiver, such as a NAVSTAR GPS Receiver PLGR (Part No. Z4 6324), and the thermal imager 32 is any commercially available thermal imager such as, and including, a FLIR imager.

The data processor 36 is a commercially available versatile, programmable, single channel pipeline processor whose core is, for example, a 32-bit floating point processor operating at 33 MHz such as the Texas Instruments TM320C30 processor. The data processor 36 includes input/output boards for providing a high-speed parallel bus interface. A frame grabber board is provided to capture images, transfer images over a parallel bus, and to display images. In all, the data processor 36 preferably has one frame grabber board, two input/output boards, and seven processor boards.

In operation, the vehicle 14 of FIG. 1 maneuvers into position to survey the target scene 12 of FIG. 1. The vehicle's position is read from the GPS receiver 30 housed on the sensor platform 16 of FIG. 1. The target scene 12 of FIG. 1 is scanned with the LADAR sensor 34 which is aligned with a compass providing a north reference. The LADAR sensor 34 collects data from the scanned target scene 12 of FIG. 1 and generates scan data representative of a 3-D image. The data processor 36 of processing center 17 further processes the scan data. This processing generally involves initially representing detected signals as data elements in a spherical coordinate system, wherein each data element includes a range value and an intensity value that correspond to a point on the target scene 12 of FIG. 1. The processor 36 then converts these data elements into a row-column format where the row-column represents the two angles in the spherical coordinate system and the data element is the range. In particular, the data processor 36 initially processes the scan data into a three-dimensional LADAR image according to a spherical coordinate system of some type, which has an origin that coincides with the location of the LADAR sensor's detecting optics. This may be performed in accordance with known techniques.

The spherical coordinate system is convenient in generating the 3-D images since the angular position of a point in the target scene 12 of FIG. 1 may be measured with respect to axes that coincide with the axes of rotation of the LADAR sensor's detecting optics during scanning of the target scene 12 of FIG. 1. Moreover, the spherical coordinate system is conducive to storing the range of a point in the target scene 12 of FIG. 1, since this range corresponds to a radius from the LADAR sensor's detecting optics to the point. Each data element also includes an intensity value, representative of the intensity of the reflected light. Additionally, each data element includes an azimuth angle and an elevation angle. As indicated, this 3-D LADAR image is stored by the processor 36 in a row-column format for later use.

Referring now to FIG. 3, the 3-D LADAR image in row column format, represented at 50, is further processed by the data processor 36 or alternatively, by an off-site processor (not shown) such as a personal computer, a mini-computer, or other suitable computing device. This further processing generally involves steps of preprocessing 52, detection 54, segmentation 56, feature extraction 58, and classification 60.

Generally, the preprocessing step 52 is directed to minimizing noise effects, such as identifying so-called intensity dropouts in the converted 3-D image, where the range value of the LADAR image is set to zero. Noise in the converted 3-D LADAR image introduced by low signal to noise ratio (SNR) conditions is processed so that performance of the overall system 10 is not degraded. In this regard, the converted LADAR image signal is used so that absolute range measurement distortion is minimized, edge preservation is maximized, and preservation of texture step (that results from actual structure in objects being imaged) is maximized.

The preprocessing 52 preferably includes one or more of the following methods: dropout identification in which low SNR range pixels are identified based on their intensity values and flagged so that subsequent processing steps can bypass any noise pixels. Dropout correction can be employed in which low SNR range pixels are identified based on their intensity values and replaced with a range value extrapolated from neighboring pixels. Averaging can be employed in which a two dimensional low pass filter is applied to the 3-D LADAR image data. Edge enhancement can be employed in which a two dimensional high pass filter is applied to the 3-D LADAR image data. A median filter may be used in which the range value is replaced by the median of the pixels in a subwindow centered about the pixel. An intensity guided median filter can be employed in which range pixels whose intensity falls above a threshold are used in a filter, and range pixels whose intensity falls below a threshold are replaced by the median of the pixels in a subwindow centered about the pixel. An alpha trim mean filter can be employed in which the pixel values are ordered, a certain number of values being removed from the top and bottom of the distribution and the remaining values being averaged. A spline smoothing function may be employed in which a spline function such as a Bezier, B-spline, or Hermite bicubicv polynomial is convolved with the 3-D LADAR image. Further, histogram equalization may be used in which a monotonically increasing function is chosen to remap pixel values such that a histogram of the remapped image is flat. Typically a subwindow used in the median filter and intensity guided median filter methods is a square with an odd number of pixels on a side such as 3×3 or 5×5. Furthermore, to reduce the computational load the window may be in the shape of a plus sign. For a separable median filter, the median is first computed in one dimensional windows, and then the median of the medians is taken. All the above processing methods are generally known in the art and can be implemented by those skilled in the art. The dropout identification process is the preferred process.

In the detection step 54, probability of detection of a target is traded against false alarm rate. The most effective strategy overall is to detect most of the targets while tolerating a moderate false detection rate. Subsequent processing steps described below remove many of the false detections but will not add any mistargets. Thus, the preferred selection criteria for detection are: (1) detect targets under all signal-to-noise ration conditions and when the targets are partially obscured and (2) pass a moderate number of false alarms. The detection step 54 is performed in accordance with methods described in copending application U.S. Ser. No. 08/107,957, entitled "SYSTEM FOR IDENTIFYING FLAT ORTHOGONAL OBJECTS USING REFLECTED ENERGY SIGNALS", filed Aug. 17, 1993 in the name of Nettles et al. The '957 application is incorporated herein by reference. In general, the detection step 54 identifies specific regions of interest in the 3-D LADAR image. The detection step 54 uses range cluster scores as a measure to locate flat, vertical surfaces in an image. More specifically, a range cluster score is computed at each pixel to determine if the pixel lies on a flat, vertical surface. The flatness of a particular surface is determined by looking at how many pixels are within a given range in a small region of interest. The given range is defined by a threshold value that can be adjusted to vary performance. For example, if a computed range cluster score exceeds a specified threshold value, the corresponding pixel is marked as a detection. If a corresponding group of pixels meets a specified size criteria, the group of pixels is referred to as a region of interest. Regions of interest, for example those regions containing one or more targets, are determined and passed to a segmenter for further processing.

A preferred algorithm for implementing the detection step 54 is as follows: To calculate the range cluster score for a pixel, a window whose size is dependent on the range to the pixel is placed about the pixel. The starting and ending columns of the range cluster window can be computed using the following equations and the values in Table 3.

| $\hat{r}$ = Row of central pixel of range cluster window. | | | |
|---|---|---|---|
| Range $R_{\hat{r},\hat{c}}$) | $\delta_1$ | $\delta_2$ | $\delta_3$ |
| ≧1201 | 1 | 1 | 1 |
| 901-1200 | 1 | 2 | 1 |
| 667-900 | 2 | 2 | 1 |
| 563-666 | 2 | 3 | 1 |
| 501-562 | 3 | 3 | 1 |
| 462-500 | 3 | 3 | 2 |
| 410-461 | 3 | 4 | 2 |
| 353-409 | 4 | 4 | 2 |
| 334-352 | 4 | 5 | 2 |
| 322-333 | 4 | 5 | 3 |
| ≦321 | 5 | 5 | 3 |

FIG. 3: Range Cluster Window Parameters
$\hat{c}$ = Column of central pixel of range cluster window.
$R_{\hat{r},\hat{c}}$ = Range to central pixel of range cluster window.
$\hat{r}_s$ = Starting row for range cluster window. = $\hat{r} - \delta_1(R_{\hat{r},\hat{c}})$
$\hat{r}_e$ = Ending row for range cluster window. = $\hat{r} + \delta_2(R_{\hat{r},\hat{c}})$
$\hat{c}_s$ = Starting column for range cluster window. = $\hat{c} + \delta_3(R_{\hat{r},\hat{c}})$
$\hat{c}_e$ = Ending column for range cluster window. = $\hat{c} + \delta_3(R_{\hat{r},\hat{c}})$ Next, a subset of the pixels in the window are compared to the center pixel. At ranges greater than 500 meters, all pixels in the perimeter of the window are used. At ranges less than or equal to 500 meters, every other pixel in the perimeter is used.

$N_w$ = Number of pixels in the range cluster window subset.

-continued

W = The set of all pixels in the range cluster window subset

= $\{(r_i c_i), 1 \leq i \leq N_w\}$ $x$ = coordinate of central pixel of range cluster window.
$z_i$ = X coordinate of pixel $i$ of range cluster window $\subset$.

$$F(x, x_i) = \begin{cases} 1 & \text{if } |x - x_i| < \delta_{RCL1} \\ 0 & \text{otherwise} \end{cases}$$

S = Range cluster score.

= $\frac{1}{N_w} \sum_{N_w}^{i=1} F(x, x_i)$ $S_*$ = Binary range cluster score.

= $\begin{cases} 1 & \text{if } S \geq \delta_{RCL2} \\ 0 & \text{otherwise} \end{cases}$ The values currently in use for the thresholds above are $\delta_{RCL1}$=1 meter and $\delta_{RCL2}$=0.75. A standard four way connected component operation is performed on the binary range cluster image. As detection components are completed, they are passed on to the segmenter as possible target detections. For each detection component, the following values are computed and passed to the segmenter:

$N_p$ = Number of pixels in a detection component.

D = The set of all pixels in a detection component.

= $\{(r_i c_i), 1 \leq i \leq N_p\}$ $(\hat{r} \hat{c})$ = Detection row Λ column centroid.

$\hat{r} = \frac{1}{N_p} \sum_{i=1}^{N_p} r_i$ $\hat{c} = \frac{1}{N_p} \sum_{i=1}^{N_p} c_i$ $\hat{R}$ = Detection range average.

= $\frac{1}{N_p} \sum_{i=1}^{N_p} R_i$

The segmentation step 56 determines, for each detection of a target, which pixels in a region of interest belong to the detected target and which belong to the detected target's background. The segmentation step identifies possible targets, for example, those whose connected pixels exceed a height threshold above the ground plane. More specifically, the segmentation step 56 separates target pixels from adjacent ground pixels and the pixels of nearby objects, such as bushes and trees.

The segmentation step 56 preferably is performed using one or more of the following methods: Reuse detection blob may be employed in which the pixels that make up a detection are taken as the segmentation of the target. Height-only detection may be used in which height above a ground plane is used to separate target pixels from surrounding ground pixels. Height detection may be used with-horizontal-edges in which height above a ground plane is used to separate target pixels from surrounding ground pixels. Horizontal separation detection may be used where separation between adjacent pixels is computed and used to remove parts of the segmentation that, although adjacent to target pixels in pixel space, are separated from target pixels in actual distance. Height with projection components may be used in which height above a ground plane is used to separate target pixels from surrounding ground pixels. A two-dimensional histogram may be computed by projecting segmentation pixels onto a grid parallel to the ground—gaps in the histogram are used to remove parts of the segmentation that, although they are adjacent to the target pixels in pixels space, are separated from the target pixels in actual distance. Dynamic edge linking may be employed in which range and/or intensity edges are computed and linked together to outline the target. Supersplicing may be employed in which segmentations are connected with components of a spliced image that have many gray level gradient local maxima coincident with the borders of the connected component. A pyramid spot may be used in which an exponentially tapering pyramid of reduced resolution versions of the image is constructed, and a spot detection operator is applied to the upper levels of the pyramid. A relaxation technique may be employed in which each pixel is assigned a probability of being a target pixel and a probability of being a background pixel based on the distance of its gray scale value from the ends of an image gray scale histogram; these probabilities are then iteratively modified based on probabilities of nearby pixels. A slope region growing technique may be employed in which a regression mask is used to compute slope over small windows, and the slope is used to classify pixels as target or non-target. Finally, a range gate may be employed in which all pixels within a certain range delta of a detection mean range are selected.

All the above processing methods are generally known in the art and can be implemented by those skilled in the art. A preferred algorithm for the segmentation step 56 employs the height with projection components method and is as follows: Segmentation starts with a detection centroid ($\hat{r}\hat{c}$) and average range $\hat{R}$ received from the detection process. A segmentation window is placed around the detection centroid that is $h_{sw}$ meters high and $w_{sw}$ meters wide. The window is sized large enough to guarantee that the target is entirely within the window regardless of whether the detection is on the middle of the target or one end of the target and regardless of the orientation of the target. This is accomplished with $h_{sw}$=8 meters and $w_{sw}$=16 meters.

$\delta_{AZ}$ = Horizontal pixel spacing
$\delta_{EL}$ = Vertical pixel spacing $\bar{r}_a$ = Starting row for segmentation window.

= $\hat{r} - \frac{h_{sw}}{2\delta_{EL}\hat{R}}$ $\bar{r}_e$ = Ending row for segmentation window.

= $\hat{r} + \frac{h_{sw}}{2\delta_{EL}\hat{R}}$ $\bar{c}_a$ = Starting column for segmentation window.

= $\hat{c} - \frac{w_{sw}}{2\delta_{AZ}\hat{R}}$ $\bar{c}_e$ = Ending column for segmentation window = $\hat{c} + \frac{w_{sw}}{2\delta_{AZ}\hat{R}}$ Next, pixels are identified within the window as possible segmentation and ground place candidates. These pixels must pass the following criteria:

Segmentation pixels
  Pixels must not be previously segmented
  Pixels must not be dropouts
Ground plane pixels
  Pixels must not be previously segmented
  Pixels must be non-detected
  Pixels must not be dropouts In the first ground plane pass the $[x_i, y_i, z_i]$ data are converted into relative height coordinates using either a default ground plane normal ("GPN") of $[0,0,-1]$ for a segmentation with no previous segmentation nearby or the last estimated ground plane normal otherwise.

$$h_i = [z_i, y_i, z_i] \text{GPN}$$

The relative heights are then quantized about $\bar{h}$ using a quantization level of 0.10 meters. The value $\bar{h}$ can be the average relative height for pixels in the window or the relative height of the detection centroid if this is easier to implement in real time. The only purpose of the parameter $\bar{h}$ is to bias the relative heights so that the quantized values are more easily histogrammed. In the equation below the "nint" operation computes the nearest integer for a real number.

$$h_i = nint(10(h_i - \bar{h}))$$

A histogram is generated using the initial ground pixels as the basis. This histogram is lowpass filtered using a square wave with a length of 11 (±5). A triangular pulse of (1,2,3,4,5,6,5,4,3,2,1) is then convolved with the filtered histogram. The location of the peak and ½ peak locations are found. These values determine which pixels are used for the first ground plane fit.

Pixels that lie within these ½ peak locations that were also used in the initial ground estimation are then used to determine the ground plane parameters for this window.

The ground plane fit determines a new coordinate system called the ground plane frame one. To compute the ground plane equation, first compute the following:

$$d_1 = \Sigma x^2 \Sigma y^2 - \Sigma xy \Sigma xy$$
$$d_2 = \Sigma x \Sigma y^2 - \Sigma xy \Sigma y$$
$$d_3 = \Sigma x \Sigma xy - \Sigma x^2 \Sigma y$$
$$d_4 = n \Sigma xy - \Sigma x \Sigma y$$

$$\alpha = \frac{\Sigma xz(n \Sigma y^2 - \Sigma y \Sigma y) - d_3 \Sigma z - d_4 \Sigma yz}{d_4}$$

$$\beta = \frac{d_3 \Sigma z - d_4 \Sigma xz + \Sigma yz(n \Sigma x^2 - \Sigma x \Sigma x)}{d_5}$$

$$\gamma = \frac{d_1 \Sigma z - d_2 \Sigma xz + d_3 \Sigma yz}{d_5}$$

The equation for the ground plane is thus:

$$h = \gamma + \alpha x + \beta y$$

The sensor frame coordinates of each pixel in the window are transformed into the ground plane frame one coordinate system and the height of each pixel is quantized and histogrammed using the previous quantization level. Since the bias has been removed, the quantization is performed about 0.

$$A = \frac{\alpha}{\sqrt{\alpha^2 + \beta^2 + 1}}$$

$$B = \frac{\beta}{\sqrt{\alpha^2 + \beta^2 + 1}}$$

$$C = -\frac{1}{\sqrt{\alpha^2 + \beta^2 + 1}}$$

$$h_1 = Ax_1 + By_1 + C(z_1 - \gamma)$$

The histogram is lowpass filtered using a square wave of (1,1,1) and then a triangular pulse of (1,2,1). As before, the peak and ½ peak locations are found.

If the height lies within the ½ peak locations, the pixel is used in the calculation of a second ground plane fit. This second ground plane determines another coordinate system, ground plane frame two. Pixels are transformed into this frame. If the ground plane frame two height of a pixel exceeds a threshold and that pixel was originally identified as a segmentation possibility, then that pixel is considered to be potential target pixel. A four-way connected component analysis is then performed.

These potential target pixels are used to increment a two dimensional ground projection histogram. The crosstrack ($V_x$) and downtrack ($V_y$) vectors are calculated which satisfy the following conditions:

Both are orthogonal to the GPN

The cross track vector is orthogonal to the LOS defined by the three dimensional centroid of the detection The downtrack vector is orthogonal to the crosstrack vector The height, downtrack, and crosstrack dispersions plus the average of the downtrack and crosstrack dispersions are estimated.

$\gamma = z$ intercept of GPN $V^r = [x_i, y_i, z_i - \gamma]$ $x_{ti} = V^r V_x$ $y_{ti} = V^r V_y$ $z_{ti} = V^r \text{GPN}$ To perform the xy-projection analysis, quantization levels must be estimated which are a function of the angular resolution, range resolution, GPN, LOS, and range. Thus two more vectors are necessary to properly quantize the data. View$_x$ corresponds to the row vector in the image, and View$_y$ corresponds to the column vector in the image. These are easily estimated since both are orthogonal to the LOS. The magnitudes of the vectors are given below. The parameter $\delta_R$ is the range resolution.

$|\text{LOS}| = \delta_n$ $|\text{View}_x| = R\delta_{AZ}$ $|\text{View}_y| = R\delta_{EL}$ With this information we can calculate the projections of $V_x$, $V_y$, and the GPN vectors on the LOS, View$_x$, and View$_y$ vectors. The rows and columns of this histogram are parallel to the downtrack and crosstrack vectors for ground plane frame two. To compute the ground projection histogram, the ground plane frame two X and Y coordinates of the potential target pixels are scaled and offset to become row and column indices to the histogram.

$R$ = Range to detection
$\delta_R$ = Range resolution
$q_{x_1} = \text{View}_x^\tau V_x \cdot R\delta_{AZ}$
$q_{x_2} = \text{View}_y^\tau V_x \cdot R\delta_{EL}$
$q_{x_3} = LOS^\tau V_x \cdot \delta_R$ $q_x = \sqrt{q_{x1}^2 + q_{x2}^2 + q_{x3}^2}$ $q_{y_1} = \text{View}_x^\tau V_y \cdot R\delta_{AZ}$
$q_{y_2} = \text{View}_y^\tau V_y \cdot R\delta_{EL}$
$q_{y_3} = LOS^\tau V_y \cdot \delta_R$ $Q_y = \sqrt{q_{y1}^2 + q_{y2}^2 + q_{y3}^2}$ Once the appropriate scaling factors are determined the $x_t$ and $y_t$ are quantized about the $x_t$ (crosstrack) and $y_t$ (downtrack) centroid.

$s_x = \frac{1}{q_x}$ $S_y = \frac{1}{q_y}$ $x_{ti}^z = nint((x_{t_i} - x_{t_0})S_x)$ $y_{ti}^z = nint((y_{t_i} - y_{t_0})S_y)$ That bin of the histogram into which the pixel falls is incremented by one as well as those bins within ±1 pixel. An 8-connected component operation is performed on the ground projection histogram. At this stage in the algorithm, we want to identify those components of the four-way connected components in the original scene that map to multiple components in the projection. This requires the determination of the equivalence between these two images and requires a two dimensional lookup table. A remapping is then performed so that components in the original image are broken up into multiple components using the projection image.

The following information is generated per each segmentation found:

Two dimensional centroid in image space
Three dimensional centroid for LOS determination
Number of pixels
Row and column extents
Average range Ancillary information that is generated per each segmentation to aid in discriminating which segmentations to pass to the feature extractor includes:

The crosstrack and downtrack dimensions
Minimum and maximum heights

For example, a segmentation that has a maximum downtrack and crosstrack extent that is less than a meter is discarded. If a segmentation has a difference in height of less than ½ meter, we assume that the segmentation is a two dimensional plane rather than a three dimensional object. A segmentation whose minimum height is greater than a given threshold above the ground plane is also discarded.

Care must be taken in determining which segmentations to pass to the feature extractor, particularly those that intersect a window boundary. The following logic has been employed successfully:

If segmentation lies totally within the window then pass to feature extractor

If segmentation intersects upper window boundary and its maximum row exceeds half the row dimension window size then pass to feature extractor If segmentation intersects left window boundary and its column maximum exceeds half the column dimension size and its row maximum is less than the row dimension window size then pass to feature extractor.

A mask is passed to the feature extraction in which each target segmentation is labeled separately.

The feature extraction step 58 provides information about a segmentation so that the target and its features in that segmentation can be classified. Features include, for example, orientation, length, width, height, radiality features, turret features, and moments. The feature extraction step 58 also preferably compensates for errors resulting from segmentation 56 and other noise contamination. The feature extraction step 58 preferably is designed to determine a target's three-dimensional orientation and size.

The feature extraction step is preferably performed by one or more of a variety of methods. Moments may be employed to determine target orientation from computing the moments of a target segmentation. A Hough transform may be employed in which target orientation is determined using a Hough transform to search through Hough space for an orientation at which the sides of a target are parallel to the axis of the Hough space. A minimum enclosed area may be employed in which orientation space is searched for an orientation at which an enclosed area (the product of width times length) is at a minimum. A regression analysis may be performed in which target orientation is computed using regression techniques. Optimal search techniques may be used in which a coarse Hough space search or regression is used to get an initial estimate of orientation, and then the estimate is refined using the minimum enclosed area technique.

All the above processing methods are generally known in the art and can be implemented by those skilled in the art. A preferred method employs the minimum enclosed area approach for determining orientation.

The feature extraction step 58 also determines a target's size, which preferably is performed by one or more of a variety of methods. Moments may be employed to determine target size from computing the moments of a target segmentation. A min max technique may be used in which target size is determined by measuring the distance between the minimum and maximum extent of a target along an axis parallel to the axis of that target. A trimmed min max technique may be used in which, after removing a certain number of pixels from each end of a target, target size is determined by measuring the distance between the minimum and maximum extent of that target along an axis parallel to the axis of that target.

All the above processing methods are generally known in the art and can be implemented by those skilled in the art. A preferred method for determining size uses the trimmed min/max method.

The feature extraction step 58 also distinguishes between targets and false alarms and between different classes of targets. This likewise is preferably performed by one or more of a variety of methods. Turret extraction may be used in which a z histogram is examined for evidence of a turret/hull interface, and if such an interface is found, then the height of the interface above the ground is calculated. Wheel detection may be used in which a Hough transform for detecting circles is used to extract images of wheels. Track detection may be employed in which track presence, location, and size are computed. Radiality may be determined in which the degree of deviation of a target from a disk is computed. Box score may be used in which the degree of deviation of a target from a box is computed. A right angle score may be determined in which the degree of deviation of the sides of a target from a right angle is computed. Side flatness may be determined in which the flatness of the sides of a target are measured from a ground plane projection histogram. Variance, skewness, and kurtosis may be determined in which the variance, skewness, and kurtosis of a target are computed from higher order moments about each axis. Finally, texture may be determined in which the texture of a target in range is computed. All the above processing methods are generally known in the art and can be implemented by those skilled in the art.

A preferred algorithm for implementing the feature extraction step 58 is as follows: The segmenter passes the following information to the feature extractor:

Ground plane information (GPN) and bias ($\gamma$)

Crosstrack $V_x$ and downtrack $V_y$ vectors $\perp$ GPN

LOS vector, View$_x$, and View$_y$

Range to segmentation

Number of pixels

Window information—starting and ending rows and columns

The LOS vector is a vector whose components are the x, y, and z centroids of the segmentation. The crosstrack ($V_x$) and downtrack ($V_y$) vectors are defined by the following formulae:

$$V_x = GPN \times LOS$$

$$V_y = GPN \times V_x$$

The remaining two vectors are the image axes vectors or View$_x$ and View$_y$. These vectors are necessary to better quantize the data for initial processing.

$$View_x = LOS \times [0,0,1]$$

$$View_y = View_x \times LOS$$

These vectors are used to transform the x,y,z data into a coordinate system defined by the $V_x$, $V_y$, and GPN vectors.

$$z_{t_i} = [x_{t_i}, y_{t_i}, z_{t_i} - \delta] \cdot V_x$$

$$y_{t_i} = [x_{t_i}, y_{t_i}, z_{t_i} - \delta] \cdot V_y$$

$$z_{t_i} = [z_{t_i}, y_{t_i}, z_{t_i} - \delta] \cdot GPN$$

Now that the data are transformed into the appropriate coordinate system, the data are quantized using the following formulae. The T superscript indicates transposition.

$R$ = Range to segmentation
$q_{x_1} = View_x^T V_x \cdot R\delta_{AZ}$
$q_{x_2} = View_y^T V_x \cdot R\delta_{EL}$
$q_{x_3} = LOS^T V_x \cdot \delta_R$ $$q_x = \sqrt{q_{x_1}^2 + q_{x_2}^2 + q_{x_3}^2}$$

$q_{y_1} = View_x^T V_y \cdot R\delta_{AZ}$
$q_{y_2} = View_y^T V_y \cdot R\delta EL$
$q_{y_3} = LOS^T V_y \cdot \delta_R$ $$q_y = \sqrt{q_{y_1}^2 + q_{y_2}^2 q(y3)^2}$$

$q_{z_1} = View_x^T GPN \cdot R\delta_{AZ}$
$q_{z_2} = LOS^T GPN \cdot R\delta_R$ $$q_z = \sqrt{q_{z_1}^2 + q_{z_2}^2 + q_{z_3}^2}$$

Once the appropriate scaling factors are determined the $x_t$ and $y_t$ are quantized about the x and y centroid. The z data are quantized about 0.

$$S_x = \frac{q}{qx}$$

$$S_y = \frac{q}{qy}$$

$$S_z = \frac{1}{qz}$$

$$x_i^* = nint((x_{t_i} - x_{t_0})S_x)$$

$$y_i^* = nint((Y_{t_i} - y_{t_0})S_y)$$

$$z_i^* = nint(z_{t_i} S_z)$$

At this stage the "visible hull" is determined which defines those pixels that are used in the orientation process. The pixels are projected on the ground and the ones lying on the exterior in possible view are identified. This is performed by determining the minimum y* for all possible x*, and estimating the minimum and maximum x* or all y*. If a pixel passes at least one of the following tests it is part of the "visible hull".

$$P_i = 1, x_{min}(y_i^*) \leq x_i^* \leq x_{min}(y_i^*) + 2$$

$$P_i = 1, x_{max}(y_i^*) - 2 \leq x_i^* \leq x_{max}(y_i^*)$$

$$P_i = 1, y_{min}(x_i^*) \leq y_i^* \leq y_{min}(x_i^*) + 2$$

Once the "visible hull" is defined, the $x_t$ and $y_t$ data are requantized where $q_x = q_y = 0.1$. The rationale behind this requantization is that the orientation algorithm relies on row and column projections which are lowpass filtered. Fixed values of $q_x$ and $q_y$ allows for the lowpass filtering length to be constant regardless of range. The quantization levels must be equal or the axes will be skewed and thus the row and column histograms would not be orthogonal.

The original quantization skews the $x_t$ and $y_t$ axes because $q_x \neq q_y$ since $q_x \sim R\delta_{AZ}$ and $q_y \sim \delta_R$. One could use a linear combination of $q_x$ and $q_y$, i.e., $(q_x + q_y)/2$, but axes skewness increases with range. The orientation algorithm integrates over a fixed length so the constant $q_x$ and $q_y$ prevents this integration from varying with range and angular resolution. The length of the lowpass filter could be determined from the linear combination but it would be a quantized approximation, so to minimize quantization errors the fixed quantization levels are used.

In the orientation procedure, only the pixels in the "visible hull" are used in the analysis. Row and column histograms are generated that vary from 0° to 89° using the following:

$$r_\theta = x_i^* \cos \theta + y_i^* \sin \theta$$

$$c_\theta = y_i^* \cos \theta - x_i^* \sin \theta$$

$$H_{r\theta} = H_{r\theta} + 1$$

$$H_{c\theta} = H_{c\theta} + 1$$

At this stage, $x^*_i$ and $y^*_i$ may not be necessary in order to minimize the operations count. Quantization and rotation can be performed in that same step. The following formulae can replace the use of the quantized x and y data:

$$r_\theta = 10((x_{t_i} - x_{t_0}) \cos \theta + (y_{t_i} - y_{t_0}) \sin \theta)$$

$$c_\theta = 10((x_{t_i} - x_{t_0}) \cos \theta + (y_{t_i} - y_{t_0}) \sin \theta)$$

After the row and column histograms have been generated over all θ, these histograms are lowpass filtered to form $H'_{rθ}$ and $H'_{cθ}$ by the following:

$$H_r\theta^1 = \sum_{i=r-2}^{r+2} H_{i\theta}$$

$$H_c\theta^1 = \sum_{i=c-2}^{c+2} H_{i\theta}$$

The orientation is that angle where the front and left edges of the target are maximized. Note the quantization and mappings, low values of y* correspond to front pixels and low values of x* correspond to left pixels. This makes use of the possible orientation that a target can exhibit. For example, we do not expect a large left edge and a large back edge—this pattern will not be a target since this describes a concave object.

The edge magnitudes are determined using the formulae:

$$left_{c\theta} = H_{(c+2)\theta}^1 - H_{(c-2)\theta}^1$$

$$front_{r\theta} = H_{(r+2)\theta}^1 - H_{(r-2)\theta}^1$$

$$maxleft\theta = max\ (left_{c\theta})$$

$$maxfront\theta = max\ (front_{r\theta})$$

$$maxr_\theta^1 = max\ (H_{r\theta})^1$$

$$maxc_\theta^1 = max\ (H_{c\theta}^1)$$

The aspect is the value of θ where $maxleft_\theta + maxfront_\theta$. If $maxc_\theta$ is greater than $maxr_\theta$, the aspect is θ=270. The algorithm attempts to make the orientation row major. If the principal axis lies along a column, the algorithm generates the required rotation that maps the principal axis to a row.

Once the orientation has been calculated, the $x_t$ and $y_t$ data are rotated about $z_{t\theta}$ and $y_{t\theta}$ by θ using the following transformation:

$$x_{ri} = (x_{ti} - x_{t\theta}) \cos\theta + (Y_{ti} - y_{t\theta}) \sin\theta$$

$$y_{ri} = (y_{ti} - y_{t\theta}) \cos\theta - (x_{ti} - x_{t\theta}) \sin\theta$$

Now the data are requantized with $q_z = q_y = 0.10$ meters. As noted before the quantization and rotation can be performed synchronously. This not only reduces computation but also reduces the number of passes required over the data. The next step is to better define the target given that its aspect is known.

The algorithm begins similarly to the orientation algorithm in that a histogram of rows and columns are generated. Only those pixels that are in the "visible hull" are utilized.

$$H_{y*z*} = \sum_{i=1}^{n} H_{y_i^* z_i^*} + 1$$

$$H_r = \sum_{i=1}^{n} H_{y_i^*}$$

The histogram of the rows ($H_r$) is lowpass filtered with a width of 5 rows, corresponding to 0.5 meters. The front edge vector is defined in the following, and the location of the maximum value determines the minimum y of the target. This value is not modifiable; all pixels that are located in front of this value are excluded from further consideration.

$$H_r^1 = \sum_{r=r-2}^{r+2} H_r$$

$$front_r = H_{r+2}^1 H_{r-8}^1$$

Now that the lower bound in the y dimension (rows) had been found, the upper bound is found by proceeding from $r_{min}+4$ to the upper row limit until $H'_r=0$. Thus the upper limit is about r-3. The only side that is constrained to be a line is the leading edge, other sides are allowed more amorphous boundaries. In general the leading edge corresponds to the principal axis while the left edge corresponds to the minor axis. The boundaries of the minor axis may be difficult to identify. Boundaries located downtrack are not straight edges, in most situations those edges are inconsistent due to internal target obscuration.

Once $r_{min}$ has been determined, a column histogram is determined using the following:

$$H_c = \sum_{c=c_{min}}^{e_{max}} \sum_{r=r_{min}}^{r_{min}+10} H_{rc}$$

Proceeding from the minimum column to the maximum column, the longest segment is determined while allowing gaps less than 10 columns (1.0 meter). The starting and ending column for the segment defines the column extent. At the present these boundaries are maximal boundaries. Pixels lying outside these boundaries are excluded from further processing.

In summary, the $row_{min}$, $row_{max}$, $col_{min}$ and $col_{max}$ have been determined. In the preceding stage of that algorithm an attempt is made to define the target outside/inside.

The next step is to attempt to prune the target by moving in an inside/outside direction. In this process a row, column histogram (projection) is generated using all segmentation pixels found within the boundaries previously established. The projection is lowpass filtered using a 3×3 basis where non-zero pixels are set to 1. A binary image is desired so that the projection may be used as a lookup table in determining the final segmentation.

The first step is to determine column minimums and maximums for each row from $row_{min}+1$ to $row_{max}$. For each column a sum is generated by $h_{(r-1)}c + h_{re} = h_{(r+1)}e$.

Starting at the column midrange ($col_{min} = col_{max}/2$) these sums are examined in two passes—one to the left and one to the right. The last positions where the sums are greater than zero and taking into account possible gaps of 1.0 meter (10 columns) determine the columns extents for each row.

The histogram is zeroed for those pixels that lie outside the column extents per row. The maximum and minimum column extents are also determined to establish length/width estimation.

The second step is to establish the row maximums per column. This is accomplished by employing a similar procedure as described above. Those pixels lying outside the bounds are set to zero in the projection image.

The final step is to look for gaps that extend through the entire length/width of the target that are at least three pixels wide. This is accomplished by histogramming the columns and rows of the projection, lowpass filtering the histograms and noting holes as a search is conducted from the midranges outwards. As before, projection pixels are turned off if ound to lie outside the bounds. The final target segmentation is accomplished by examining the corresponding values in the projection image. The approximate target dimensions in $x_r$ and $y_r$ are estimated using the row and column extremes. If the row extremes exceed the column extremes, the aspect is rotated by 90°.

$$Seg_i = H_{y_i z_i}$$

Once the target has been better defined, estimations of the target dimensions are calculated. Again the quantized x, y, and z values are used in this process. A simple procedure that performs moderately well is to prune off a certain percentage of the outliers and determine the extent of the remaining pixels. Questions arise as to what is the best percentage to use and what effects does this have on the sparse side of the distribution since the disperson of x and y values are far from uniform. An approach that attempts to circumvent these problems examines the yz extents for each x, the xz extents for each y, and the xy extents for each z. When these extents are greater than a threshold then one limit of the target distribution has been determined. This is accomplished by the following:

$$h_{x^*} = \sum_{i=1}^{n} h_{x_i} + Seg_i$$

$$h_{y^*} = \sum_{i=1}^{n} h_{y_i} + Seg_i$$

$$h_{z^*} = \sum_{i=1}^{n} h_{z_i} + Seg_i$$

$$y_{min}(x^*) = \min(y_{min}(x^*), y^*_i)$$

$$y_{max}(x^*) = \max(y_{max}(x^*), y^*_i)$$

$$x_{min}(y^*) = \min(x_{min}(y^*), x^*_i)$$

$$x_{max}(y^*) = \max(x_{max}(y^*), x^*_i)$$

$$z_{min}(x^*) = \min(z_{min}(x^*), z^*_i)$$

$$z_{max}(x^*) = \max(z_{max}(x^*), z^*_i)$$

$$z_{min}(y^*) = \min(z_{min}(y^*), z^*_i)$$

$$z_{max}(y^*) = \max(z_{max}(y^*), z^*_i)$$

$$y_{min}(z^*) = \min(y_{min}(z^*), y^*_i)$$

$$y_{max}(z^*) = \max(y_{max}(z^*), y^*_i)$$

$$z_{min}(z^*) = \min(x_{min}(z^*), x^*_i)$$

$$x_{max}(z^*) = \max(x_{max}(z^*), x^*_i)$$

The histograms are lowpass filtered (±1). The minmax arrays are blurred in the sense mins are the mins ±1 and the maxs are the maxs ±1. Then where the histograms have more than three pixels—hopefully establishing that a plane not a line or point is evident—the extent of the mins and maxs is determined and when this value exceeds a threshold that defines a boundary of the target.

Length=(mxaxs−xmins+1)·0.10

Width=(ymaxs−ymins+1)·0.10

Height=zmaxs·0.10

Another feature is the location of the hull. Tanks have a large flat plane located at certain heights, while other targets which have a more box-like structure (MLRS, APC's, trucks) have large flat areas located at the height of the target. The hull height is estimated by histogramming the quantized z-values that lie within the previously established bounds. The histogram is lowpass filtered and convolved with a triangular pulse with a width of 3. The point at which the convolution is maximized is the hull height.

$$h_{z^*} = \sum_{i=1}^{n} h_{z_i^*} + Seg_i$$

$$h_{z^*}' = \sum_{i=z_i^*-1}^{z_i^*+1} h_i$$

$$h_{z^*}'' = \sum_{i=z_i^*-1}^{z_i^*+1} h_{z_i^*}' \omega_i - 2_i^*$$

$$\omega = (1,2,1)$$

The segmentation is then separated into two distributions—those pixels lying below and above the hull. Dimensions are found of both distributions per the preceding discussion. Three dimensional centroid displacement from the above hull and below hull distributions are calculated.

Other z features that are calculated from the entire segmentation include

Variance—zvar
Skewness—zskew
Kirtosis—zkurt $$n_\rho = \sum_{i=1}^{n} Seg_i$$

$$m_2 = \frac{\sum_{i=1}^{n}(z_i - \bar{z})^2}{n_\rho}$$

$$m_3 = \frac{\sum_{i=1}^{n}(z_i - \bar{z})^3}{n_\rho}$$

$$m_4 = \frac{\sum_{i=1}^{n}(z_i - \bar{z})^4}{n_\rho}$$

$$z_{var} = m_2$$

$$z_{skew} = \frac{m_3}{2 m_2^{1.6}}$$

$$z_{kurt} = \frac{m_4}{m_2^2}$$

A box value is also calculated to aid in differentiating more box-like structured targets. This is estimated as that percentage of pixels found near the extremes of the x, y, and z distributions.

To help in discriminating trees and bushes whose dimensions are similar to true targets, a radiality measure is estimated. The premise is that vegetation exhibits circular structure in the x-y plane.

Currently several radiality measures are estimated by projecting the data at various orientations and include—radius at orientation θ ($R_θ$), average radius for all θ, radius of curvature at θ ($C_θ$), average radius of curvature for all θ, variance of the radius for all θ, and the variance for the radius of curvature for all θ.

$$R_\theta = \sup(x_{t_i} \cos\theta + Y_{t_i} \sin\theta) Seg_i = 1$$

$$C_\theta = R_\theta - 0.5 R_{\theta-1} - 0.5 R_{\theta+1}$$

A more complete discussion of this methodology can be found in J. L. Prince and A. S. Willsky's *Reconstructing Convex Sets from Support Line Measurements*, IEEE T-PAMI, 12, 4, 1990, 377–389.

The classification step 60 classifies segmentations to contain particular targets, preferably in a two stage process. First, features such as length, width, height, height variance, height skewness, height kurtosis, and radiality measures are used to initially discard non-target segmentations. The segmentations that survive this step are then matched with true target data stored in a target database. The data in the target database, for example, may include length, width, height, average height, hull height, and turret height to classify a target. The classification step 60 is performed using known methods for table look-ups and comparisons.

A preferred algorithm for the classification step 60 is as follows: Those segmentations that survive this initial selection are then matched with true target data (prototype vectors) that include:

Length, width, and height
Average height
Hull height
Turret height

Features per segmentation are then matched with the available target selection features and classified as such. A simple match score is calculated for each component by the following:

$i$ = Featurevectorforsegmentation$i$ $j$ = Target$j$ $k$ = Feature$k$ $n$ = Numberoffeatures $$\text{Match}^j = \frac{\Sigma^n_{k=1} 1.0 - \frac{|f_{i_k} - f_{i_k}|}{f_{i_k}}}{n}$$

The only complexity allowed is in the estimation of the match score using length and width. It has been found that certain orientations exhibit uniqueness in the dimension estimation. Primarily those that are factors of 90°. In many circumstances a target oriented crosstrack to the sensor has an accurate length estimate but its width estimate may be poor. Conversely a target oriented downtrack has an accurate width, and length may be underestimated—partially a function of target self-obfuscation. In many cases the width exceeds the length, and as a consequence the orientation is rotated by 90° and the width is assigned to the length.

Therefore the classifier must also consider the effects of target orientation on the length and width estimates. Thus if the orientation is within a threshold of these critical points (±n 90°), the best match found between the following is used:

$$\text{Match}^j_{length_i} = 1.0 - \frac{|length_i - length_j|}{length_j}$$

$$\text{Match}^j_{width_i} = 1.0 - \frac{|width_i - width_j|}{width_j}$$

$$\text{Match}^j_{lenwid_i} = 1.0 - \frac{|length_i - width_j|}{width_j}$$

and then added to the other match scores. Otherwise we assume length should match with length and width matches width, since at the other orientations, dimension estimation should be more accurate.

This match score determines the percent match of one vector with another. This is in a sense a discriminant measure. If the best match score (maximum) exceeds the allowable threshold then that segmentation is identified as that target type.

Data obtained from the segmentation step 56, the feature extraction step 58, and the classification step 60 is assembled into a packet of information (shown in FIG. 4). FIG. 4 shows the packet of information 62 which may be rapidly and accurately transmitted to the remote 22 of FIG. 1 site over a limited bandwidth communications link or, alternatively, may be used to display a target in one of a variety of user-selectable formats (shown in FIGS. 5A, 5B and 5C). In accordance with the present invention, the packet of information 62 to be transmitted consists of a data packet header 64 and a data block 66a–66n for each target detected. For example, if four targets are detected, the packet of information 62 consists of a header 64 and four data blocks 66a–66d. The header 64 includes information characterizing the LADAR sensor 34 (shown in FIG. 2), the vehicle 14 (shown in FIG. 1) and the number of data blocks 66.

Each data block 66a–66n includes an image header and image data. More specifically, each data block's image header contains target data such as, and including, a target identification, target location and target features. Additionally, each data block's image header preferably contains information generated during segmentation 56 (shown in FIG. 3). Each data block's image data preferably contains information relating to a corresponding image's range, intensity, FLIR and segmentation mask. Also, in accordance with the present invention, each data block 66a–66n typically stores between 16 and 29 bits of image data. These 16 to 29 bits of image data are made up of 8 to 12 bits of range data, 7 to 8 bits of intensity data, 7 to 8 bits of FLIR data and one bit for a mask value.

Figure 5A:
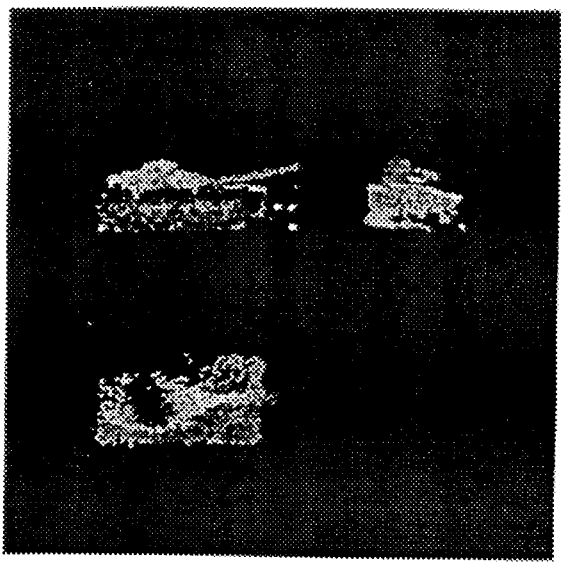
FIG. 5a illustrates a display option for 3-Direction View of the transmitted segment.

The packet of information 62 may be transmitted via the limited bandwidth communications link 20 (shown in FIG. 1) to the remote site 22 (shown in FIG. 1) for display on a video display 24 (shown in FIG. 1). For example, a combat platform or control and command node at a remote site and using this invention, has access to data characterizing a local scene. The transmitted packet of information 62 contains all information necessary for a receiving platform to display the detected target in the local scene in a number of user-selectable formats (shown in FIGS. 5A–5C). Specifically, a receiving platform (for example, remote site 22, shown in FIG. 1) can display the detected target in a 3 view such that the detected target is displayed as illustrated in FIG. 5A. This 3 view is a view commonly used by armed forces to identify targets during combat. Additionally, the receiving platform may display the detected image utilizing a north reference plan view as illustrated in FIG. 5B or a rotated perspective, as shown in FIG. 5C.

More specifically, the unique display options available to the operator, either local or remote, are based on the 3-D nature of the LADAR image. The results of the feature extraction processing provides target information including orientation, length, width and height. Since the target image can be displayed from any perspective, independent of the sensor perspective, the operator can select one of the several display formats that utilize the adjustable perspective. The first of these options is the 3 view of FIG. 5A. This display format is constituted using the calculated orientation in the rectangular coordinate system. Three orthogonal views of the target are displayed by adjusting the perspective of the viewer to the vehicle based coordinates {x=0, y=0, z=1000 meters} (top view), {x=0, y=1000 meters, z=0} (side view) and {x=1000 meters, y=0, z=0} (front view). These 3 views are displayed simultaneously to the operator to provide visual cues in the identification of the target.

Figure 5B:
FIG. 5b illustrates a display option for North Reference Plan View of the transmitted segment.
Figure 8C:
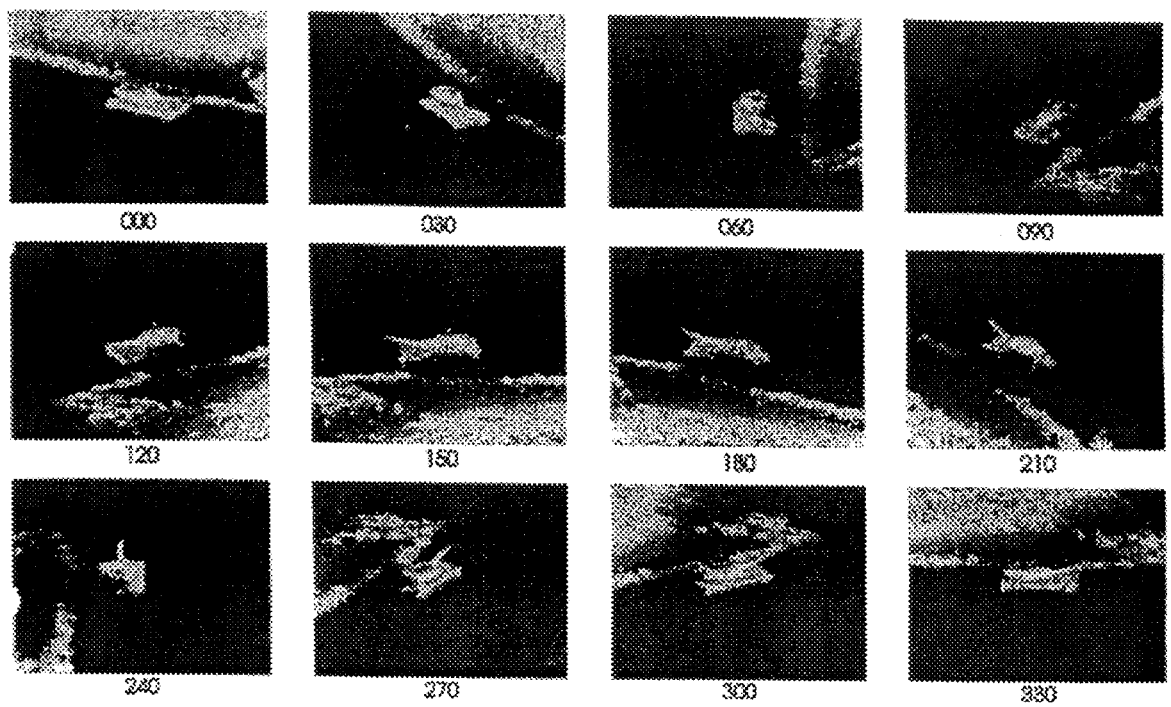

The second display option is the north reference plan view of FIG. 5B. This display option is generated by adjusting the perspective of the viewer to {x=cos (compass bearing) x–sin (compass bearing) y meters, y=sin (compass bearing) x+cos (compass bearing) y meters, z=1000 meters), using the calculated orientation x(aspect) from the feature extraction and the compass leaving angle from the compass. This display option provides an operation to quickly determine vehicle (target) direction.

The third display option is the rotating view of FIG. 5C which moves the viewer perspective in rapid sequence to allow the operation to view a 360 degree sequence of perspectives. These perspectives are generated by first setting the origin of the Cartisian coordinates at the target centroid. Next, the yaw is incremented through 360 degrees in small (10 degree) increments about the Z axis. Then at each increment, the Y axis is rotated to provide a depression angle, and the eye point (perspective) is set for that sequence. This sequence is repeated so that the effective display provides the illusion of the viewer moving in a circle around the target.

All of the above processing methods are generally known in the art and can be implemented by those skilled in the art.

The above described invention makes it possible in a number of military and civilian applications to integrate advanced sensor technology and digital communications options to enable a remote sensor to quickly and accurately transmit high fidelity imagery of a target scene over limited bandwidth data links. For instance, unmanned air and ground vehicles used both for military and commercial purposes may be programmed to find topographical and man-made features automatically. For other civilian applications such as law enforcement, data for robotics force-fighting, crime deterrence, and border patrol functions may be quickly and accurately transmitted. Additionally, it is possible to monitor roadways and provide data for vehicle collision avoidance. In strictly military applications, battlefield synchronizations, situational awareness, and combat identification demands rapid and accurate transmission of high-quality information between soldier and decision-maker. For example, application of combined arms tactics gives a commander a flexible fighting force, and also expands information sharing requirements among force components. The present invention provides a valuable tool for such applications.

While a specific embodiment of the invention has been described, the inventive principles themselves should not be so limited. Rather, the scope and breadth of applicants' invention should be construed by the following appended claims in view of such inventive principles.

What is claimed is:

1. A method of detecting an object in a scene at a point remote from the scene, comprising the steps of:
   laser scanning the scene to provide scan data representing a three-dimensional record of the scene including the object;
   processing the scan data at a local site to segment the object in the scene; and
   transmitting substantially only said segmented data to a remote site for viewing the object at the remote site.

2. The method of detecting according to claim 1 wherein the step of transmitting includes transmitting at a video rate over a transmission medium having a bandwidth of 16 kilobits per second or less.

3. The method according to claim 2 wherein the video transmission rate is on the order of 7.9 megabytes per second.

4. The method according to claim 1 and including the step of displaying the segmented data at the remote site in one of three optional modes.

5. The method according to claim 1 wherein the step of processing the scan data comprises the steps of:

a) detecting possible objects from the scan data;
b) segmenting the detected scan data to objects from the scene;
c) extracting features from the segmented data to distinguish between types of objects; and
d) classifying the segmented objects and extracted features according to known classifications.

6. The method according to claim 5 wherein the step of detecting includes the step of determining the existence of one or more surfaces of a particular shape relative to a ground plane.

7. The method according to claim 5 wherein the step of segmenting includes the steps of determining a dimension of the object relative to a ground plane, and projecting such objects onto a ground plane, so that the object can be separated from its background in the scene.

8. The method according to claim 5 wherein the step of extracting includes the step of determining a dimension of the object by measuring the distance between generally minimum and maximum extents of the object along an axis substantially parallel to an axis of that object.

9. A method of creating and transmitting an image of a target over a limited bandwidth transmission medium from an on-site location to a remote location, comprising the steps of:
   LADAR scanning on-site a scene to provide scan data representing an on-site, three-dimensional record of the scene including the target;
   processing the data on-site to separate segment data representative of the target from the remaining scene data;
   transmitting substantially only the segment data to a remote site over the limited bandwidth transmission media; and
   displaying the transmitted data at the remote site to provide an image of the target at the remote site.

10. The method of detecting according to claim 9 wherein the step of transmitting includes transmitting at a video rate over a transmission medium having a bandwidth of 16 kilobits per second or less.

11. The method according to claim 10 wherein the video transmission rate is on the order of 7.9 megabytes per second.

12. The method according to claim 10 wherein the step of displaying includes the step of displaying the target image in one of three optional modes.

13. Apparatus for displaying a target in a target scene, comprising:
   a LADAR scanner for scanning the target scene to produce scan data representing a three-dimensional record of the scene including the target;
   a data processor coupled to the LADAR scanner for correlating the scan data to identify a segment of the data representative of substantially only the target in relation to the scene and for producing segmented data representative of substantially only the target;
   a transmitter coupled to the data processor for transmitting the segmented data to a site remote from the scene; and
   a display operatively coupled to the transmitter for displaying the transmitted data at the remote site, thereby to display the target at the remote site.

14. The apparatus for displaying a target according to claim 13, and including a transmission medium linking the transmitter and the remote site, and having a bandwidth of 16 kilobits per second or less.

15. The apparatus for displaying according to claim 14 wherein the transmitter is a video transmitter for transmitting at video rates on the order of 7.9 megabytes per second.

16. The apparatus for displaying according to claim 14 wherein said display has means for visually presenting the target in one of three optional modes.

17. The apparatus for displaying a target according to claim 14 wherein the data processor includes:

a) means responsive to the scan data for detecting possible objects in the scene;

b) means responsive to the detected scan data for segmenting the object from the scene;

c) means for extracting features to distinguish between types of objects; and d) means responsive to the segmented scan data and the extracted features for classifying the object according to known classifications.

18. The apparatus for displaying a target according to claim 17 wherein the means for segmenting includes means for determining a dimension of the object relative to a ground plane, and for projecting such objects onto a ground plane, so that the object can be separated from its background in the scene.

19. The apparatus for displaying a target according to claim 17 wherein the means for extracting includes means for determining a dimension of the object by measuring the distance between generally minimum and maximum extents of the object along an axis substantially parallel to an axis of that object.

20. The apparatus for displaying a target according to claim 17 wherein the means for detecting includes means for determining the existence of one or more surfaces of a particular shape relative to a ground plane.

* * * * *